United States Patent
Greenwood (10) Patent No.: US 7,784,585 B2
(45) Date of Patent: Aug. 31, 2010

(54) WIRE MESH HEAT SHIELD ISOLATOR

(75) Inventor: George Greenwood, Tiverton, RI (US)

(73) Assignee: ACS Industries, Inc., Lincoln, RI (US)

( * ) Notice: Subject to any disclaimer, the term of this patent is extended or adjusted under 35 U.S.C. 154(b) by 1158 days.

(21) Appl. No.: 11/098,822

(22) Filed: Apr. 5, 2005

(65) Prior Publication Data

US 2006/0219860 A1    Oct. 5, 2006

(51) Int. Cl.
*F01N 5/00* (2006.01)
(52) U.S. Cl. ............... 181/211; 29/450; 29/509; 29/512; 29/523
(58) Field of Classification Search ............ 181/211; 29/450, 506, 512, 523
See application file for complete search history.

(56) References Cited

U.S. PATENT DOCUMENTS

| | | | | |
|---|---|---|---|---|
| 3,223,374 A | * | 12/1965 | Butler et al. | 267/141.4 |
| 3,593,399 A | * | 7/1971 | Bannister | 29/898.047 |
| 3,766,631 A | * | 10/1973 | Scheitlin et al. | 29/424 |
| 4,865,792 A | * | 9/1989 | Moyer | 264/249 |
| 2005/0040576 A1 | * | 2/2005 | Oxenknecht et al. | 267/293 |
| 2005/0258613 A1 | * | 11/2005 | Kleckner | 280/124.107 |

* cited by examiner

*Primary Examiner*—Jeffrey Donels
*Assistant Examiner*—Forrest M Phillips
(74) *Attorney, Agent, or Firm*—Maurice M. Klee (57) ABSTRACT

A substrate such as a heat shield for a vehicle is provided with a unitary compressed wire mesh bushing or isolator formed in place though a bore in the substrate. The bushing is formed by supporting an uncompressed or partially compressed wire mesh sleeve, optionally including a grommet or spacer, on a mandrel positioned within the bore; the mandrel is surrounded on either side of the bore by outer sleeves forming a molding cavity on each side of the substrate, and a slidable tamp is disposed in each outer sleeve and moved towards each other to compress the mesh within the bore and provide the unitary bushing.

15 Claims, 11 Drawing Sheets

WIRE MESH HEAT SHIELD ISOLATOR

BACKGROUND OF THE INVENTION

This invention relates to mechanical wire mesh isolators and similar bushings suitable for high temperature use and to methods and apparatus for making the same.

Devices made from knitted wire mesh are commonly used as seals, bushings, seats, and supports in and around exhaust systems for internal combustion engines. In these types of devices, a wire is knitted into a mesh, and the mesh is compacted in a die into a particular shape. Sometimes the compaction is partial, and the partially-compacted structure can be infiltrated with a high temperature resistant material, such as described in U.S. Pat. No. 5,385,873 (the disclosure of which is incorporated herein by reference). At other times the compaction results in a denser article that can be used as a bushing at the end of a catalytic converter, such as described in U.S. Pat. Nos. 4,683,010 and 6,286,840 (the disclosures of which are incorporated herein by reference). Still other devices are even more densely compacted and can be used as a filter in an air bag assembly, as described in U.S. Pat. No. 6,277,166 (the disclosure of which is incorporated herein by reference).

The combustion that takes place in an internal combustion engine of an automotive vehicle produces substantial amounts of heated noxious gas and significant amounts of noise. As a result, all automotive vehicles include an exhaust system that transports the exhaust gas from the engine to a location on the vehicle where the heat exhaust gas can be emitted safely. The exhaust system includes a converter to catalyze compounds in the exhaust gas into less noxious gases. Other components of the exhaust system function to attenuate the noise associated with the flowing and rapidly expanding gases produced by the combustion processes in the engine.

The typical exhaust system extends from the engine compartment near the front of the vehicle to a location at or near the rear of the vehicle where the exhaust gases may be emitted safely. The exhaust system typically includes a plurality of pipes, a catalytic converter and at least one muffler. These various components of the vehicle must compete for space on the underside of the vehicle with other necessary components of the vehicle. There is an even higher premium on space in the engine compartment, where heat shields are used around exhaust manifolds and close coupled converters (that is, catalytic converters that are mounted very near the exhaust manifold). The entire exhaust system becomes very hot after a short period of operation due to the high temperatures generated during the combustion processes that produce the exhaust gas and the catalytic reaction in the converter. The realities of designing an exhaust system to fit into the limited space on the underside of a vehicle typically positions certain components of the exhaust system close to passenger compartments, luggage compartments or other heat sensitive components or sections on the vehicle. As a result, most exhaust systems must include at least one heat shield, including a heat shield near the muffler.

The typical heat shield for a muffler is a thin sheet of metal that is stamped or otherwise formed to conform generally to the shape of the muffler. The heat shield may be formed with legs or other structures that provide small areas for attaching the heat shield to the muffler. A major portion of the typical heat shield is spaced from the outer shell of the muffler to provide an air gap that will insulate sensitive areas of the vehicle from the heated muffler. The heat shield typically is secured to the muffler by welding. However, other attachment means, such as straps, rivets, bolts or folded seams have been employed in the prior art.

Heat shields can be designed to perform their primary heat shielding function adequately. Parts of the heat shield necessarily must be spaced from the muffler to perform the heat shielding function. As a result, the heat shield is substantially cooler than adjacent areas of the muffler. The temperature differential between the heat shield and the muffler leads to differential thermal expansion. Therefore, the use of weldments or other such attachments between the heat shield and the muffler are subject to substantial and repeated forces as the muffler goes through its heating and cooling cycles. Additionally, the entire exhaust system is subject to significant vibration during use. Consequently, welded attachments between the heat shield and the muffler are subject to failure. A failed connection will cause the heat shield to vibrate against the exterior of the muffler and/or against other nearby parts of the vehicle. Such vibrations can create very objectionable noise. A folded connection between the heat shield and the muffler can be designed to accommodate some motion during differential thermal expansion without adversely affecting the long term connection between the muffler and the heat shield. However, folds or other such mechanical connections also are subject to vibration during use and hence can generate objectionable noise.

Figure 1:
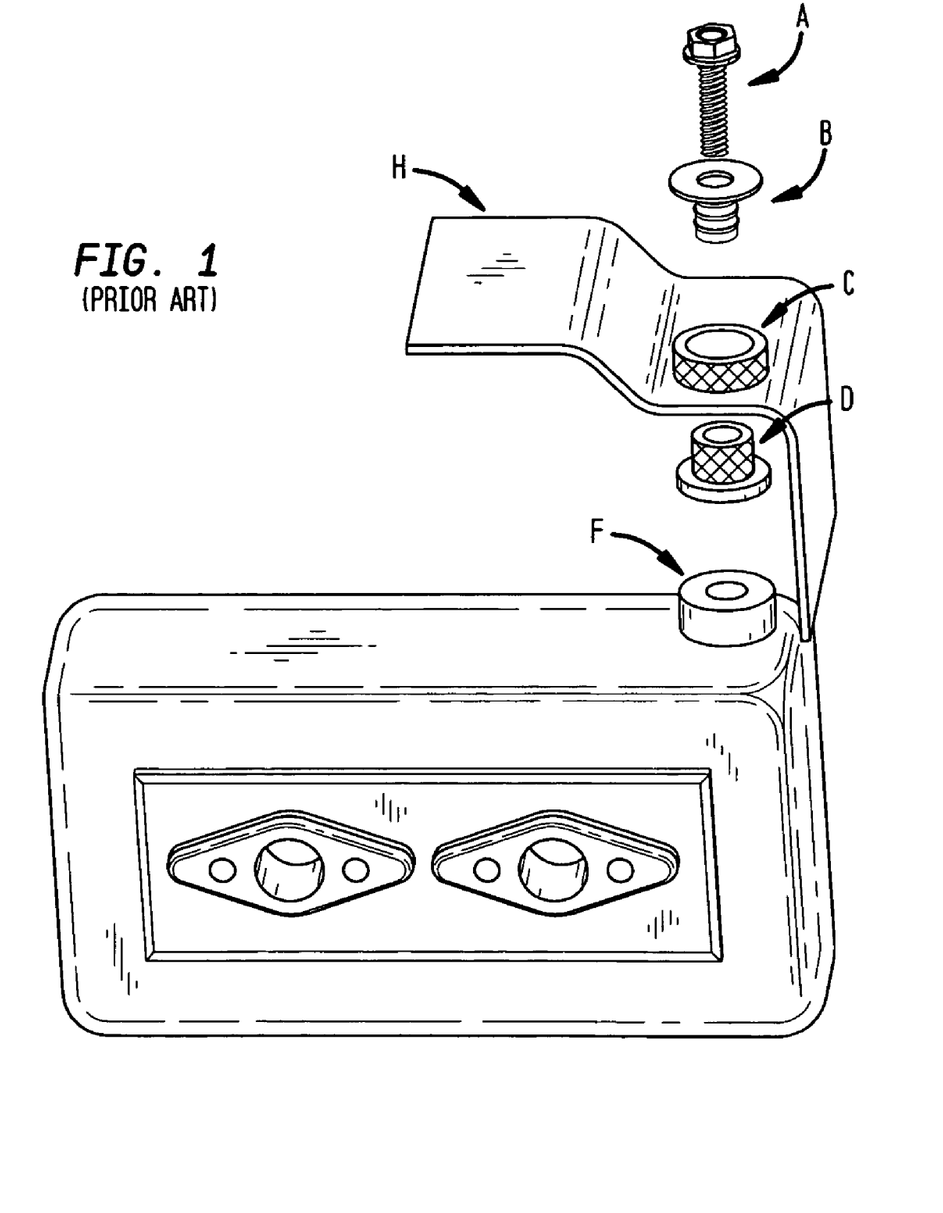
FIGS. 1-3 depict, respectively, an exploded, cutaway, and assembled view of a prior art heat shield isolator.
Figure 2:
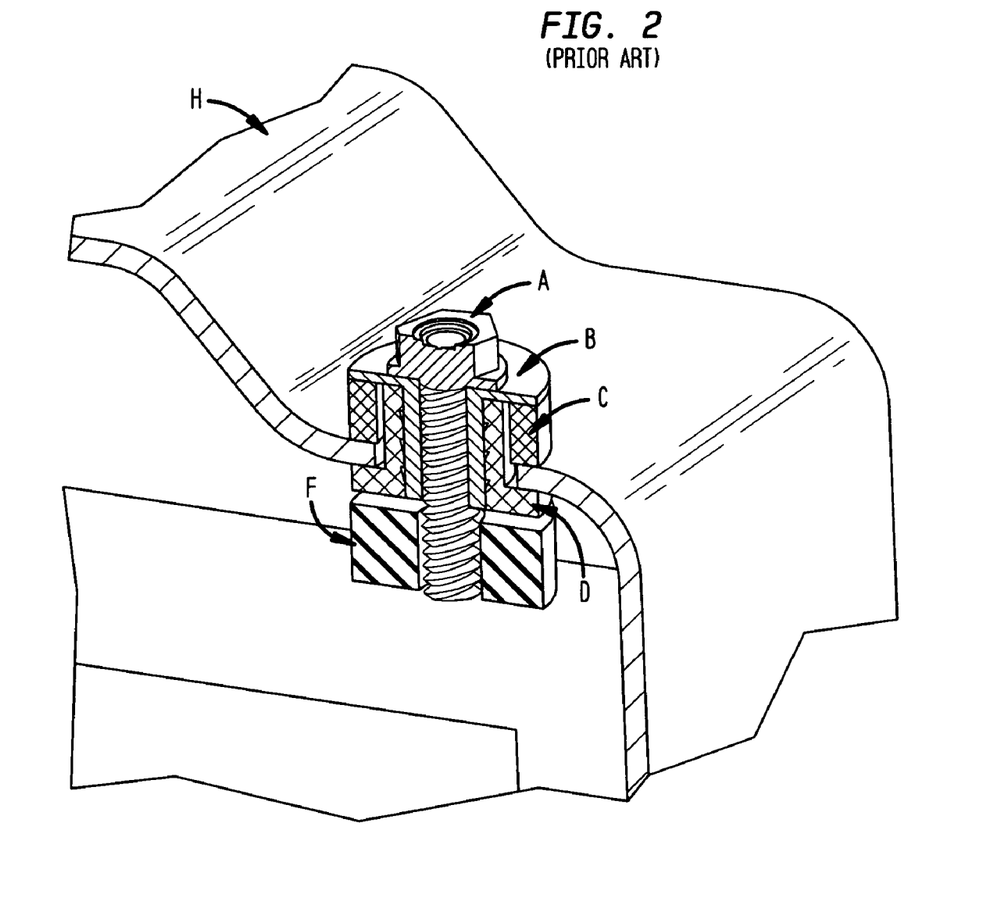
Figure 3:
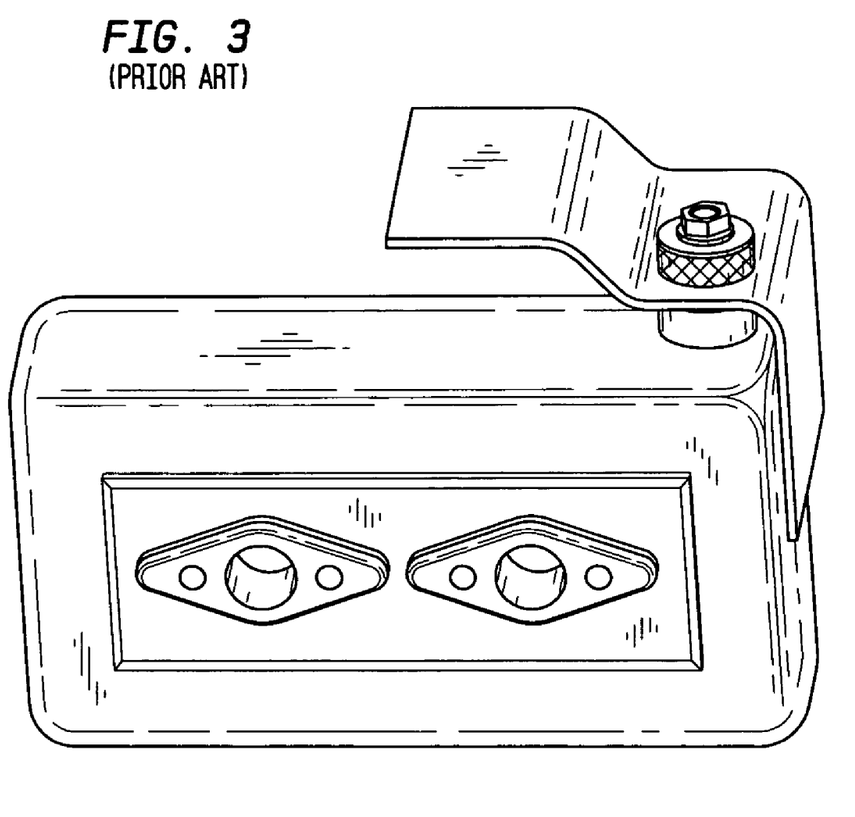

To overcome some of these problems, a two part wire mesh isolator or bushing assembly is used, as shown in FIGS. 1 and 2. These usually consist of a hex head cap screw (A) and a solid headed, metal, barbed grommet (B). In combination, the screw and the grommet hold together the two parts, a wire mesh collar (C) and a wire mesh grommet (D) of the isolator. In use, the two wire mesh parts, the collar and mesh grommet, of the isolator must be located and held in place adjacent a bore in the heat shield (H). The solid grommet is located through the collar into the mesh grommet, and inserting the screw into the support fitment (F) (attached to a mock-up of an exhaust manifold in the figure) which compresses the mesh into the barbs on the grommet to lock the two wire mesh parts together by friction. However, the vibration and thermal expansion during use of the vehicle can cause the mesh to unwind. There is also the problem of having to locate the two mesh parts in place during assembly. Yet another problem occurs: when assembled heat shields are shipped to the end user (manufacturer), the barbed solid grommet works it way out during transportation and handling, so the shield reaches the production line without the grommet and the mesh components.

SUMMARY OF THE INVENTION

In light of the foregoing, among the objects of this invention are to provide an isolator, a mechanical bushing, that is a single piece attached to the heat shield, that avoids the problem of unwinding present with a two part device, that provides a heat shield to the customer with the isolators already in place, and, being unitary, will not come apart. It is also an object of this invention to provide an apparatus that can simultaneously provide isolators on the heat shield.

In summary, in one embodiment this invention provides a heat shield having a bore between first and second surfaces and having a unitary wire mesh isolator formed in the bore with a flange on each of the surfaces.

In another embodiment provides a press apparatus adapted to support a heat shield having predefined locations and number of bores for accepting isolators, a corresponding number of press tools adapted for forming the isolators and located corresponding to the bores, each tool comprising upper and lower primary sleeves, upper and lower secondary sleeves adapted for axial movement within a corresponding primary sleeve, each of said secondary sleeves including a mandrel adapted for movement within its respective secondary sleeve, the upper and lower primary and secondary sleeves and the mandrels being co-linear.

In another embodiment, the press apparatus is used to make simultaneously an isolator in each bore of the shield by positioning the shield in a holding device, providing a press tool at each bore in which a sleeve is desired, and for each press tool: positioning a wire mesh on the mandrel portion of a the lower secondary sleeve, advancing the lower primary and lower secondary sleeve of the tool to make the lower primary sleeve abut the shield and the mandrel portion and mesh extend partly through the bore; advancing a an upper primary sleeve from the opposite side of the shield co-linearly with the lower primary sleeve to abut the shield and form a co-linear cavity on opposing sides of the shield, advancing the upper secondary sleeve and upper mandrel to abut the upper mandrel co-linearly with the lower mandrel, and advancing the upper and lower inner sleeves simultaneously to compress the mesh into a flange on each side of the shield.

DETAILED DESCRIPTION OF SPECIFIC EMBODIMENTS

As explained in the Background section, the heat shield isolator of this invention is a mechanical, heat resistant bushing formed in place of wire mesh.

Starting with FIGS. 7A-7E, a heat shield 101 (or other substrate) having at least one bore in which an isolator is desired to be formed is positioned in a working area (not shown) and held so that the bore is positioned along the axis of a tool according to this invention. The invention can be used with any substrate, preferably metal, having a bore and able to withstand the compressive force of the forming process. In particular, the tool comprises a lower outer sleeve 703a and an upper outer sleeve 703b, a lower inner sleeve 705 having a lower tamp 706 and a mandrel 707 disposed in the lower outer sleeve and an upper tamp 709 disposed in the upper outer sleeve. All of these parts are coaxial, with those in the "upper" portion positioned on one side of the bore and those in the "lower" portion positioned on the opposite side of the bore. Of course, it should be obvious that the "upper" and "lower" portions can be reversed, and need not be vertically "upper" and "lower," nor that the mandrel being in the "lower" portion, so long as the parts of the tool are disposed along a common axis on opposite sides of a bore in which a unitary wire mesh mechanical bushing is desired to be formed. The presses can be electrically operated, but preferably are pneumatic, using multiple air cylinders (such as can be purchased commercially from Fabco-Air, Inc., Gainsville, Fla., or from Festo USA, Hauppauge, N.Y.).

A wire mesh sleeve 701 "green" part is provided by means of a conventional knitting machine and may be partially compressed into a cylindrical geometry to facilitate handling. Of course, the tool can be designed with an elliptical or polygonal cross sectional geometry, but a circular geometry is preferred for a grommet and screw that have a circular geometry. More preferably, the green part is made by knitting a sleeve to a desired length (or cutting a continuous length at the desired length), flattening the sleeve, and then rolling the sleeve around a mandrel (either by straight rolling, helically, or any combination), and removing the mandrel to provide the green piece. The rolled green piece can be kept from unrolling by using small spot welds, one or more staples, an adhesive (hot melt, epoxy, urethane, and the like, heat or UV curable as required for the particular adhesive, or as desired), a paper or thin plastic outer sleeve, or a slight crimping, or a combination thereof. Preferably the rolled green part is sealed along the entire seam so that the "blossoming" of the mesh during compression is relatively even along the entire length. Securing the seam of the green part also facilitates shipment of green parts to a customer for assembly of the isolators at the customer's facility.

The mandrel can include a grommet 803 or spacer 901, as shown and described later, which is left in place until the green part is used, or is forced into the green part. The use of a grommet or spacer is useful during the final assembly of the heat shield to the manifold because the axial length of the bore in the spacer or grommet effectively limits the compression of the mesh during installation. These isolators provide both mechanical and thermal isolation. The mechanical isolation is facilitated by the open structure of the compressed mesh, which is most preferably about 20-25% dense for a typical automobile installation, although depending on the particular installation a higher or lower density can be used as desired. The thermal insulation is likewise facilitated by the open structure, allowing air to convect through the structure and thus dissipate some of the heat.

Figure 5:
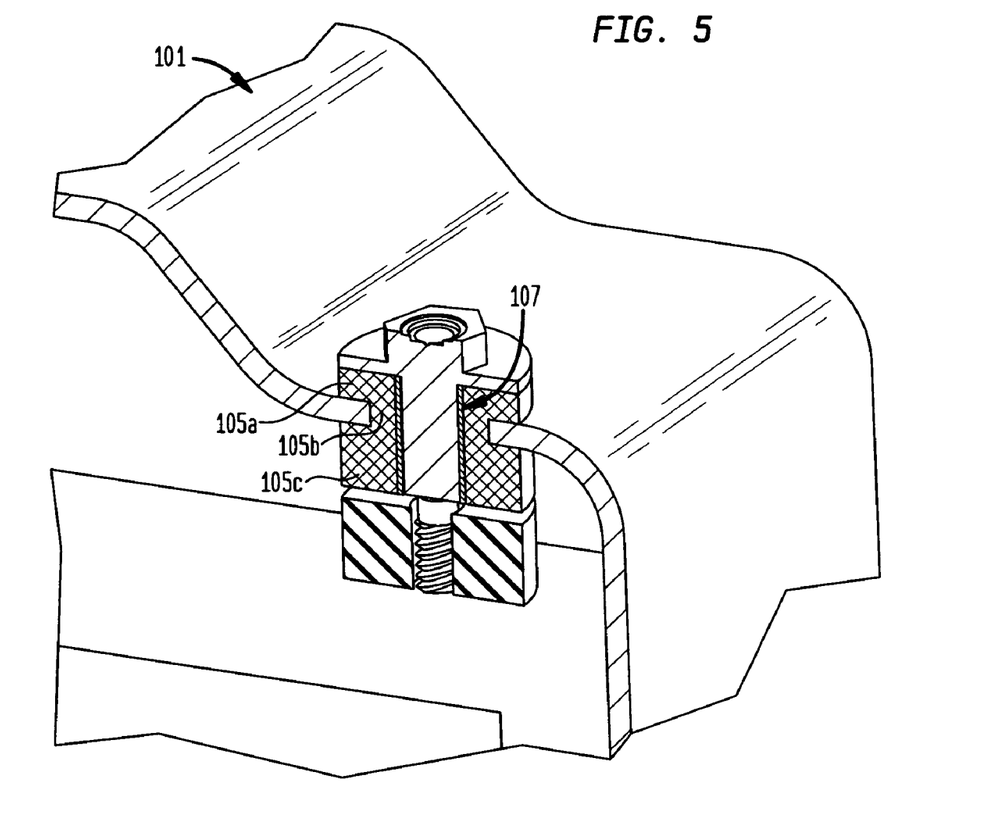
Figures 7A, 7B:
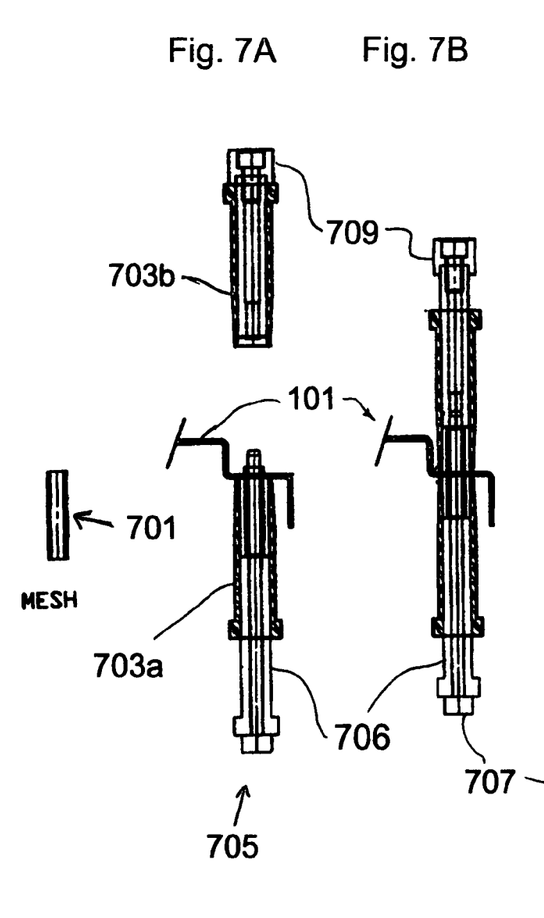
FIG. 7A-7E depict discrete cycle steps of a tool making the novel isolator.
Figure 7C:
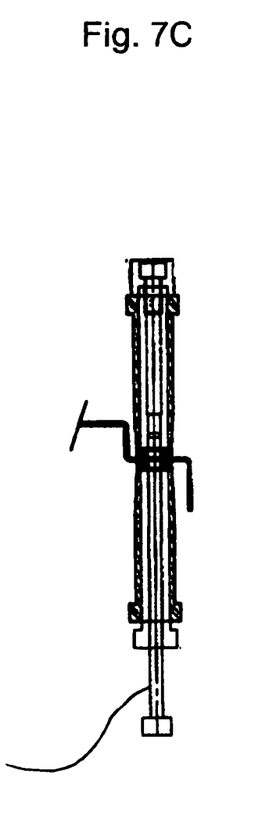
Figure 7D:
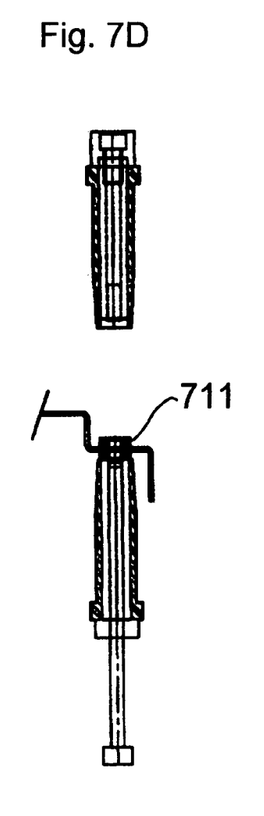
Figure 7E:
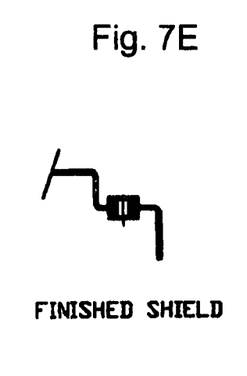

The mandrel is extended is extended through the lower tamp to provide a mandrel on which the green part is placed. As shown in FIG. 7A, the lower outer sleeve with the green mesh part in place is made to abut one side of the bore in the heat shield with the mandrel extending through the bore to the other side; the lower inner tamp supports the mesh, and a space or clearance between the mandrel and the outer sleeve, bounded by the substrate and the tamp, effectively provides a mold cavity. Next, the upper outer sleeve is lowered to abut the heat shield around the bore to provide a corresponding mold cavity on the other side of the bore. The lower tamp and mandrel are advanced upwardly so that the mandrel abuts the upper tamp and green part is disposed (with approximately) half above and half below the bore, and the upper tamp is moved downwardly to hold the green part in place straddling the bore, as shown in FIG. 7B. Then, as shown in FIG. 7C, the upper and lower tamps are moved towards each other to compress the green mesh, noting that the lower tamp does not travel the entire distance of the lower sleeve. As seen, there is a space between the mandrel and each of the outer sleeves into which the compressed mesh expands to form the isolator with flanges 105a and 105c, as shown in FIG. 5, and a neck portion 105b of the compressed mesh remaining within the bore. The mandrel is then retracted, the upper sleeve and tamp are raised (separated from the heat shield), and the lower mandrel is raised the final portion within the lower outer sleeve to ejected the finished isolator. The tool is then indexed to start another cycle. The tool can be operated by cams, servo motors, pneumatic cylinders, hydraulic cylinders, or a combination as desired, and control can be mechanical (such as with cams), electrical (such as relays and sensors), computer (such as sensors and actuators), or any combination.

Figure 8A:
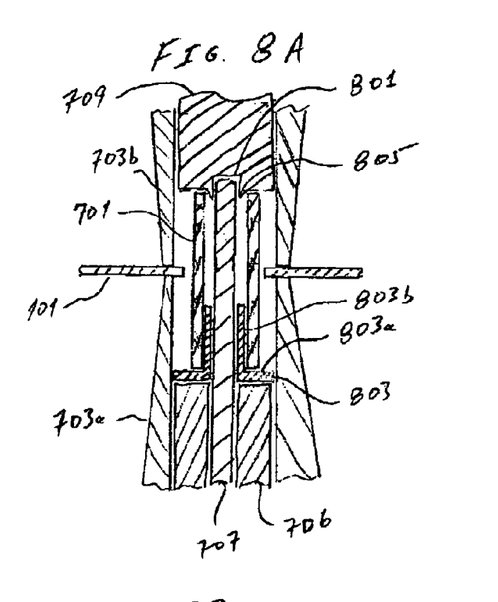
FIG. 8A depicts a partial cross-sectional view as in FIG. 7B of another embodiment.

In another embodiment, the green mesh part can include a grommet 803 having a shoulder portion 803a and an inner tubular portion 803b, the grommet being as described above. The green part with the grommet can be shipped to a customer for use in the press. FIG. 8A shows the grommet at the bottom of the green part, but the grommet likewise could be at the top. As shown with the grommet in the bottom in FIG. 8A, the opposing sleeve 709 (that is, opposing sleeve 706) includes a recess 801 into which the top of the mandrel 707 is guided. Around the periphery of the recess is a wedge-shaped structure 805 that acts to flare out the tubular portion of the grommet to form a concave or bevel 807 as shown in FIG. 8B, which depicts the formed isolator.

It should be appreciated that the drawings are not to scale. The outer diameter of the shoulder portion of the grommet, although shown as almost the same as the inner diameter of the outer sleeve 703a can be much less, and can be smaller than the diameter of the hole in the heat shield in which the isolator is formed. Even in such a case, the purpose of the grommet as a compression limiter during assembly is accomplished by the tubular portion.

Figure 8B:
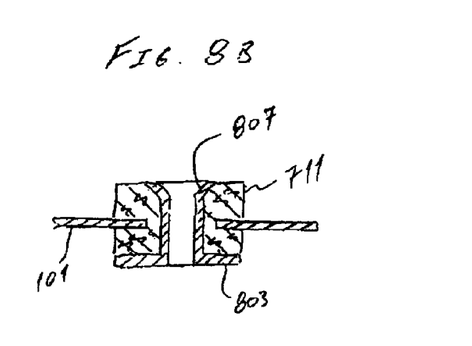
FIG. 8B depicts an isolator formed thereby.
Figure 9A:
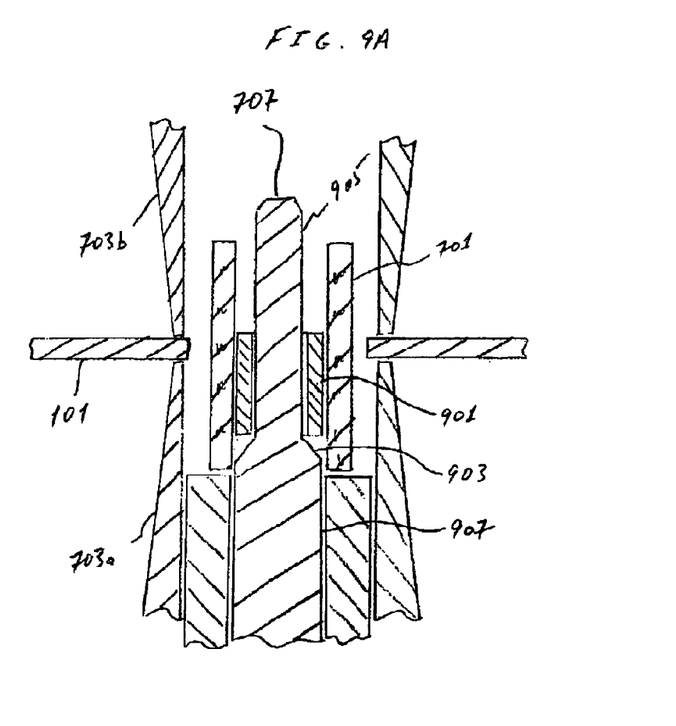
FIG. 9A depicts a partial cross-sectional view as in FIG. 7B of yet another embodiment.
Figure 9B:
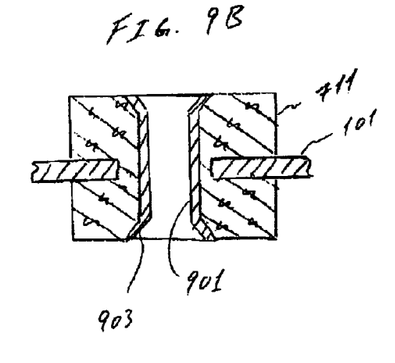
FIG. 9B depicts an isolator formed thereby.
Figure 10:
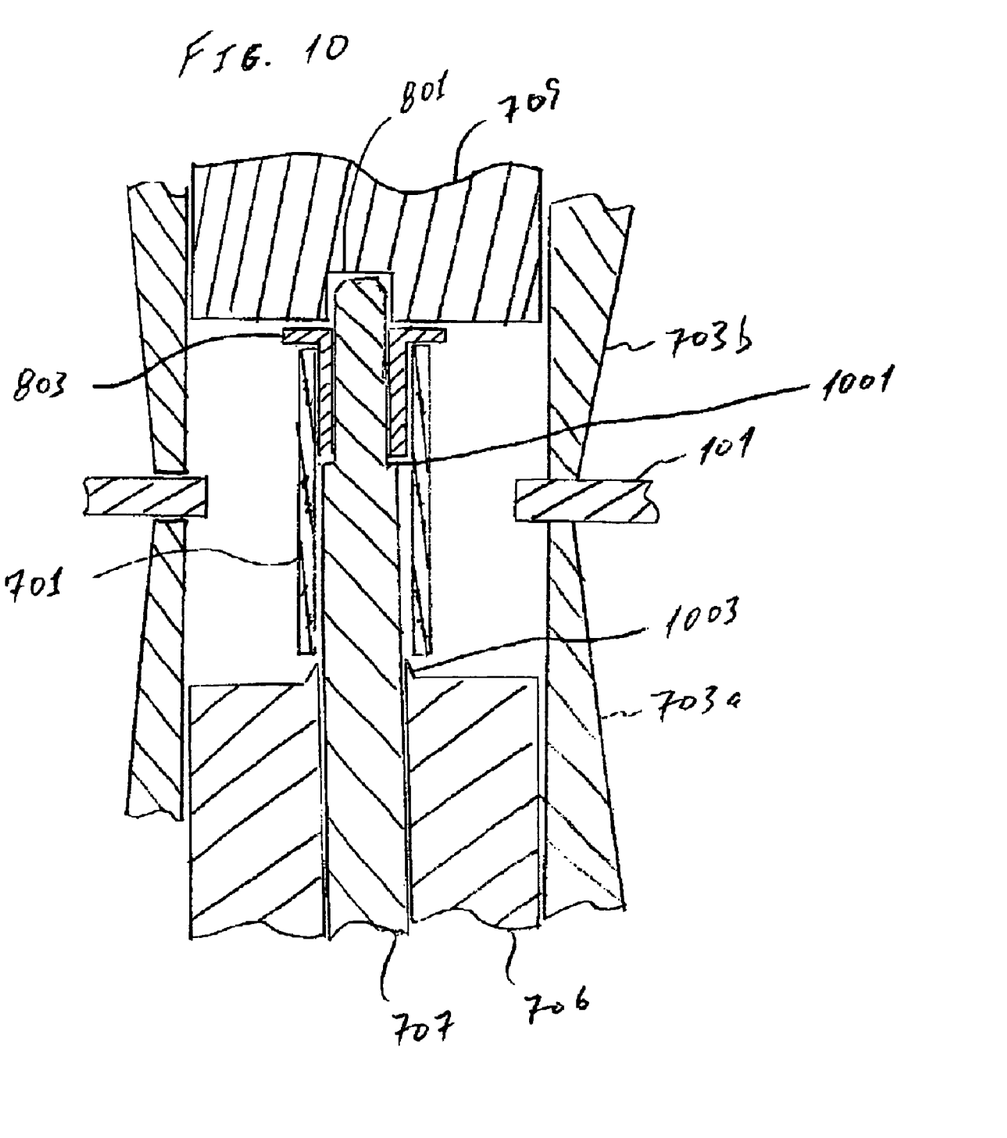
FIG. 10 is a partial cross section similar to FIG. 8A but with the grommet on the top.

As an alternative to the grommet shown in FIGS. 8A and 8B, the green part can be rolled around a simple spacer 901, and the resulting green part, as shown in FIG. 9A, is used in the press. Preferably, both of the opposing sleeves 706 and 709 include a wedge-shaped portion to flare out each end of the spacer. Alternatively, as shown in FIG. 9A, the mandrel 707 can include a bevel 903 connecting a smaller diameter portion 905, having a diameter providing a close fit with the ID of the spacer, to a larger diameter portion 907, being the desired ID of the compressed mesh portion of the isolator, where the bevel acts to flare the end of the spacer. Although some of the mesh may be compressed into the space between the end of the spacer and the bevel, the spacer will still provide the effect of limiting the final compression when the screw is driven during attachment of the heat shield. FIG. 9B shows the final isolator having a flared portion 903. Again, although the OD of the flared portion is shown as almost the same as the ID of the hole (bore) in the isolator, it can be much less. As mentioned, the grommet 803 can be placed at the "top" of the green part, as shown in FIG. 10. Also as mentioned, the OD of the shoulder portion of the grommet can be much less than the ID of the hole in the heat shield, as shown more to this scale n FIG. 10. In this embodiment, the mandrel 707 includes a distal portion of a given diameter connected by a shoulder 1001 to a larger diameter that abuts the bottom of the tubular portion of the grommet. During compression, the shoulder on the mandrel merely follows the bottom of the grommet down to its final location. In this embodiment, analogous to the wedge-shaped portion 085 in FIG. 8A, there is a wedge-shaped portion 1003 on the inner sleeve 706 to flare the end of the grommet to make the part as shown in FIG. 8B (but turned upside down). In addition, the OD of the shoulder portion of the mandrel is slightly less than the ID of the tubular portion of the grommet, so that as the inner sleeve 706 comes into contact with the bottom edge of the tubular portion previously held by the shoulder, the wedge flares out that end of the tube.

In yet another embodiment, the grommet 803 or spacer 901 can be provided with one or more ribs on the outer surface (i.e., of the tubular portion 803b when a grommet is used), or grooves, or openings (apertures), or a combination. Drawn or swaged ribs are generally not as sharp and well-defined as barbs and so do not greatly increase the cost of the part as is the manufacture of well-defined barbs (which significantly increases the cost of the part). During compression the mesh is forced around the rib(s), which acts to hold the grommet or spacer in place during shipment and handling before the heat shield is attached. When openings are used, the mesh will be forced into the opening (or into a groove), but prevented from traversing the opening and occupying the central bore because the mandrel 707 acts as a stop, thereby leaving the central bore free for the screw or bolt used for attachment of the heat shield.

Figure 11A:
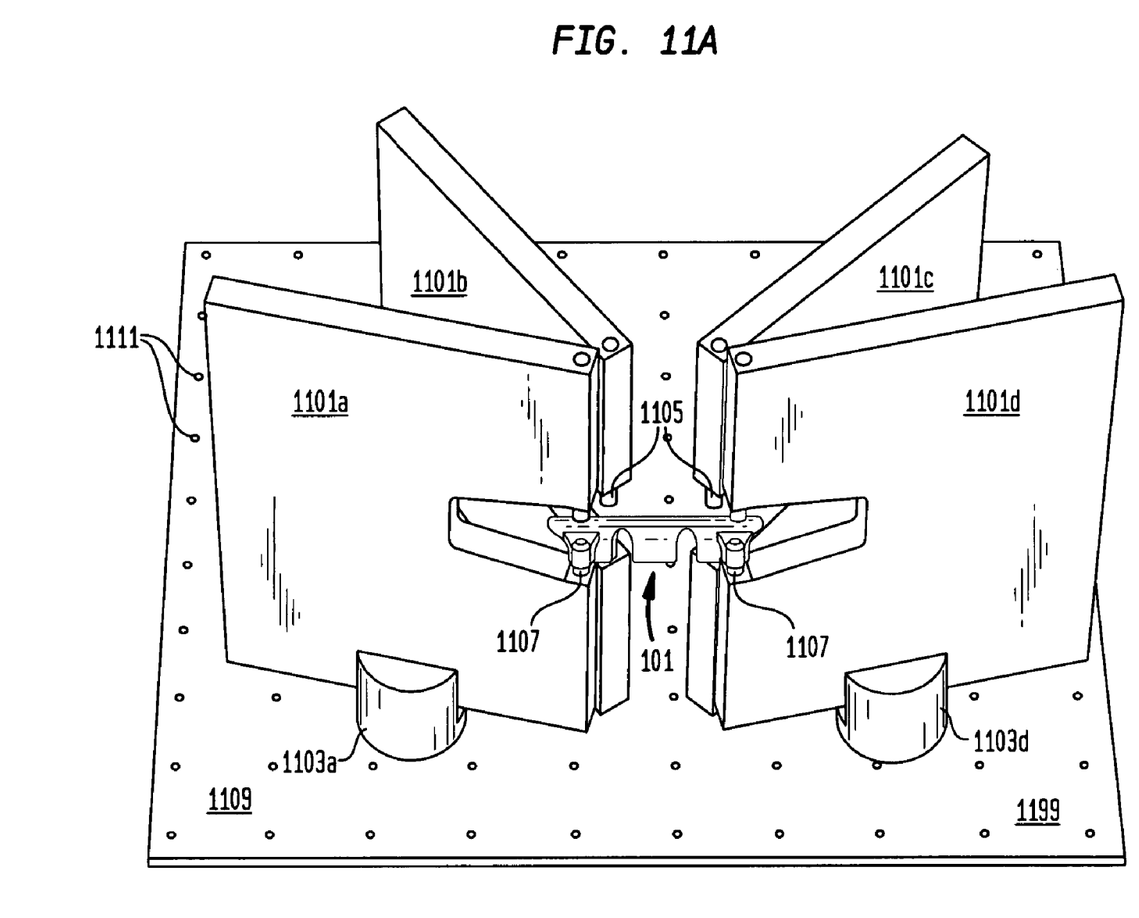
FIGS. 11A and 11B are, respectively, front and rear perspective views of a universal table including presses for making the heat shield isolators.
Figure 11B:
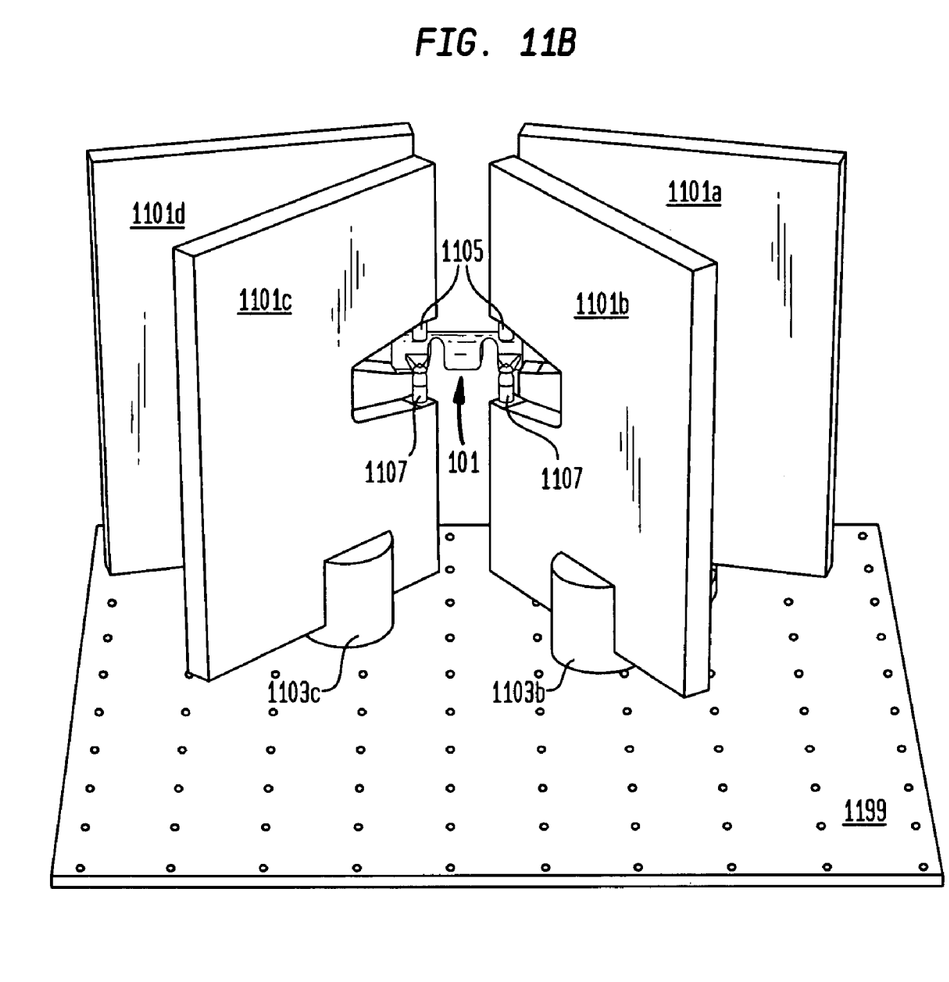

Although the production of a single isolator has been shown, it is preferred to have a press with the desired number of tools positioned at desired locations in desired orientations because many heat shields require more than one isolator, and not all isolators are in the same plane or at the same orientation. For example, if a given heat shield requires four isolators, then four tools would be mounted to a common table and their positions and orientations adjusted for the particular heat shield. Then, any number of heat shields can be processed at the same table. FIGS. 11A and 11B depict the front and back of such a table or platform, having a surface 1199 including a series of holes 1111 on which are mounted board-shaped panels 1101a-d, each of which houses a single press. Each press (i.e., each panel housing a press) is seated in a foot 1103a and 1103d being towards the front of the table and shown in the view. Each press has an upper 1105 and lower 1107 press element. Each foot (and there may be more than one foot per press) is attached to the table by one or more milling machine straps (not shown) and secured to the desired hole(s). Each foot can also have or be made with a jack for raising or lowering each panel housing, with the operating arm (crank) for the jack extending out through the foot, although other mechanical means can be used to adjust the height of each press (such as using feet of different heights). Each press preferably has an umbilical cable connecting with a computer or micro-processor controller, which can cycle the machine as desired. In use, the presses are positioned as needed for a particular heat shield 101 (or substrate), the green part is placed in each of the bores of the heat shield, the heat shield is placed on the bottom presses, and the operator moves back and activates the machine. Preferably, the back and sides are shielded or curtained-off, and the front has a light screen (depicted by 1109), analogous to an air screen, but preventing cycling of the machine when an object is in the screen (so the operator must be removed from the work area for the machine to cycle).

Figure 4:
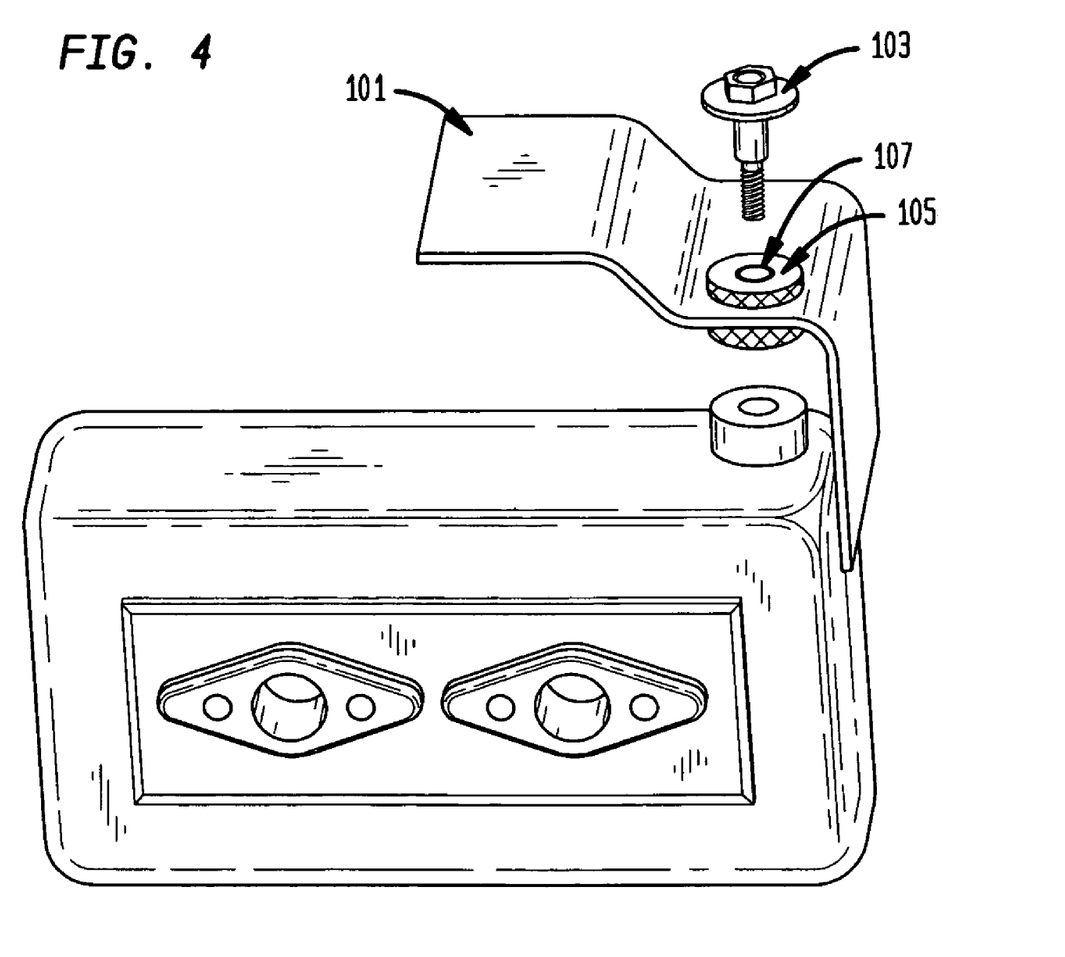
FIGS. 4-6 depict, respectively, an exploded, cutaway, and assembled view of the heat shield isolator according to this invention.
Figure 6:
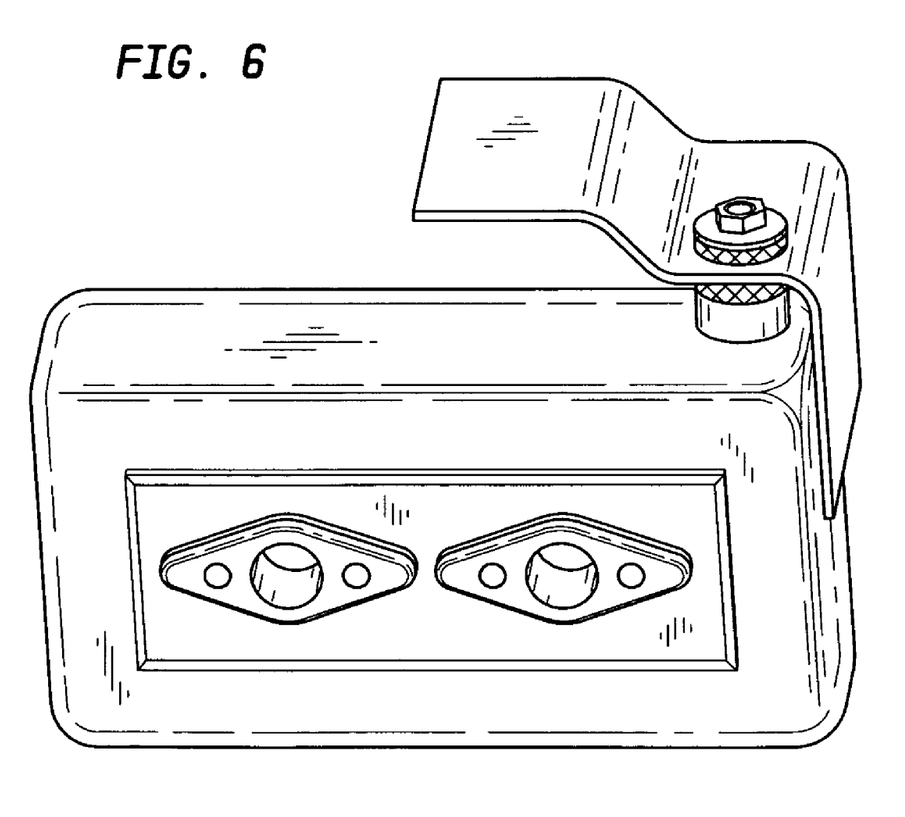

As shown in FIGS. 4-6, the novel isolator of this invention is used as in the prior art, although preferably with a screw 103 having a shoulder portion pressed into bore 107 the isolator; the shoulder portion acts as a limiter when the screw is driven in the manifold to prevent the mesh from becoming too compressed by the assembly operation. The use of a shoulder portion on the screw allows the elimination of a barbed grommet or flange sleeve, which is a relatively expensive part. Unlike the prior art, the unitary isolator will not loosen or come apart due to vibration and/or thermal expansion. The finished heated shield with the isolators in place can be shipped to the customer directly, facilitating attachment of the heat shield and eliminating the necessity of positioning the two parts of the isolator while it is formed on the heat shield.

The pre-compression, if any, and the density of the "green" part, as well as the spacing and clearances between the mandrel and the outer sleeves can be varied as needed to provide an isolator having a desired final density and geometry.

The wire used should be as heat and corrosion resistant as necessary for the particular environment, with a thermal expansion acceptable for the tolerance of the installation, preferably a steel with limited or no hardening. Suitable steel grades include Types 304 and 430, although plain carbon, plated, or galvanized steel can also be used. The mesh can be made of one or more types of steel. If the environment is very (ultra) high temperature, an Inconel or Hastalloy type of steel is more suitable. The geometry of the wire is preferably round, although other geometries, including square, hex, flat, D-shaped, oval, and the like are also suitable. The wire diameter is preferably in the range of 0.004 to 0.020 inch, and more preferably 0.005 to 0.010 inch, although even larger diameters can be suitable for a more robust installation (such as a truck).

While the foregoing description applies to heat shields, it will be appreciated that the present invention is useful for making mechanical wire mesh bushings for any application, in any article, so long as the tool can be positioned properly about the bore. For those applications where a mechanical bumper or cushion is desired instead of a bushing, during compressing the mandrel can be positioned essentially flush with the end of the lower tamp during compression so that the mesh expands into and fills the bore.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A substrate having two sides and a bore extending between the two sides, and a unitary compressed wire mesh isolator extending through the bore, said isolator comprising a neck portion which is located within the bore and two flanges, one flange being on each of the two sides of the substrate, each flange having a diameter larger than the diameter of the substrate's bore on the corresponding side wherein:
   (i) the substrate comprises a formed sheet of metal;
   (ii) the isolator includes a bore that receives a mounting screw or bolt during use of the substrate;
   (iii) prior to the insertion of the mounting screw or bolt into the isolator's bore, the flanges attach the isolator to the substrate; and
   (iv) the neck portion and the two flanges:
      (a) each comprises compressed wire mesh; and
      (b) together constitute a single piece.

2. The substrate of claim 1, wherein the substrate is a heat shield.

3. The substrate of claim 1, wherein the isolator includes a spacer in the isolator's bore.

4. The substrate of claim 1, wherein the isolator includes a grommet in the isolator's bore.

5. A method for making a unitary wire mesh isolator in a bore of a substrate which comprises a formed sheet of metal, comprising the steps of:

positioning an uncompressed or partially compressed wire mesh sleeve on a mandrel within the bore, a portion of the wire mesh sleeve extending from each side of the bore;

providing an outer sleeve on each side of the bore abutting the substrate to provide a mold cavity; providing a tamp within each sleeve; advancing the tamps towards each other to compress the wire mesh sleeve into an isolator comprising a neck portion located within the bore and a flange larger than the bore on each side of the substrate;

wherein:
   (i) the mandrel is maintained within the wire mesh sleeve during compression so that the isolator includes a bore that receives a mounting screw or bolt during use of the substrate, (ii) prior to the insertion of the mounting screw or bolt into the isolator's bore, the flanges attach the isolator to the substrate, and (iii) the neck portion located within the bore and the flange larger than the bore on each side of the substrate:
      (a) each comprises compressed wire mesh; and
      (b) together constitute a single piece.

6. The method of claim 5, wherein the wire mesh sleeve is provided with a spacer disposed within the sleeve.

7. The method of claim 5, wherein the wire mesh sleeve is provided with a grommet having a tubular portion disposed within the sleeve.

8. An apparatus for making a wire mesh isolator in a bore in a substrate which comprises a formed sheet of metal, said isolator comprising a neck portion which is located within the substrate's bore and two flanges on opposite sides of the substrate, the neck portion and the two flanges each comprising compressed wire mesh and together constituting a single piece, said apparatus comprising: means for supporting the substrate in a desired orientation; opposing upper and lower outer sleeves moveable coaxially towards and away from the bore along the axis of the bore, said upper and lower outer sleeves having leading portions for abutting opposite sides of the substrate; an upper tamp slidable within the upper sleeve along the same axis for forming one of the flanges; a lower tamp slidable within the lower sleeve along the same axis for forming the other flange, said lower tamp having a central bore along the same axis; and a mandrel slidable within the central bore of the lower tamp along the same axis.

9. The apparatus of claim 8, wherein one of the tamps has an end including a wedge-shaped portion.

10. The apparatus of claim 8, wherein the mandrel includes a distal portion of a predetermined diameter connected by a shoulder to a portion having a larger diameter.

11. The apparatus of claim 10, wherein the shoulder is beveled.

12. A press, comprising: a plurality of the apparatus of claim 8, each said apparatus disposed in a separate housing; a platform; and at least one foot attached to each housing, and each foot releasably secured to the platform.

13. The press of claim 12, wherein each apparatus includes pneumatic cylinders for the sleeves, tamps, and mandrel.

14. The press of claim 13, further comprising a micro-processor for controlling the cycling of the apparatus, and wherein each housing further comprises a control cable for connecting to the micro-processor.

15. The press of claim 12, wherein the housings are positionable on the platform.

* * * * *